R. F. LEITZKE.
AUTOMATIC COUPLING.
APPLICATION FILED NOV. 9, 1920.
1,382,296.
Patented June 21, 1921.
2 SHEETS—SHEET 1.
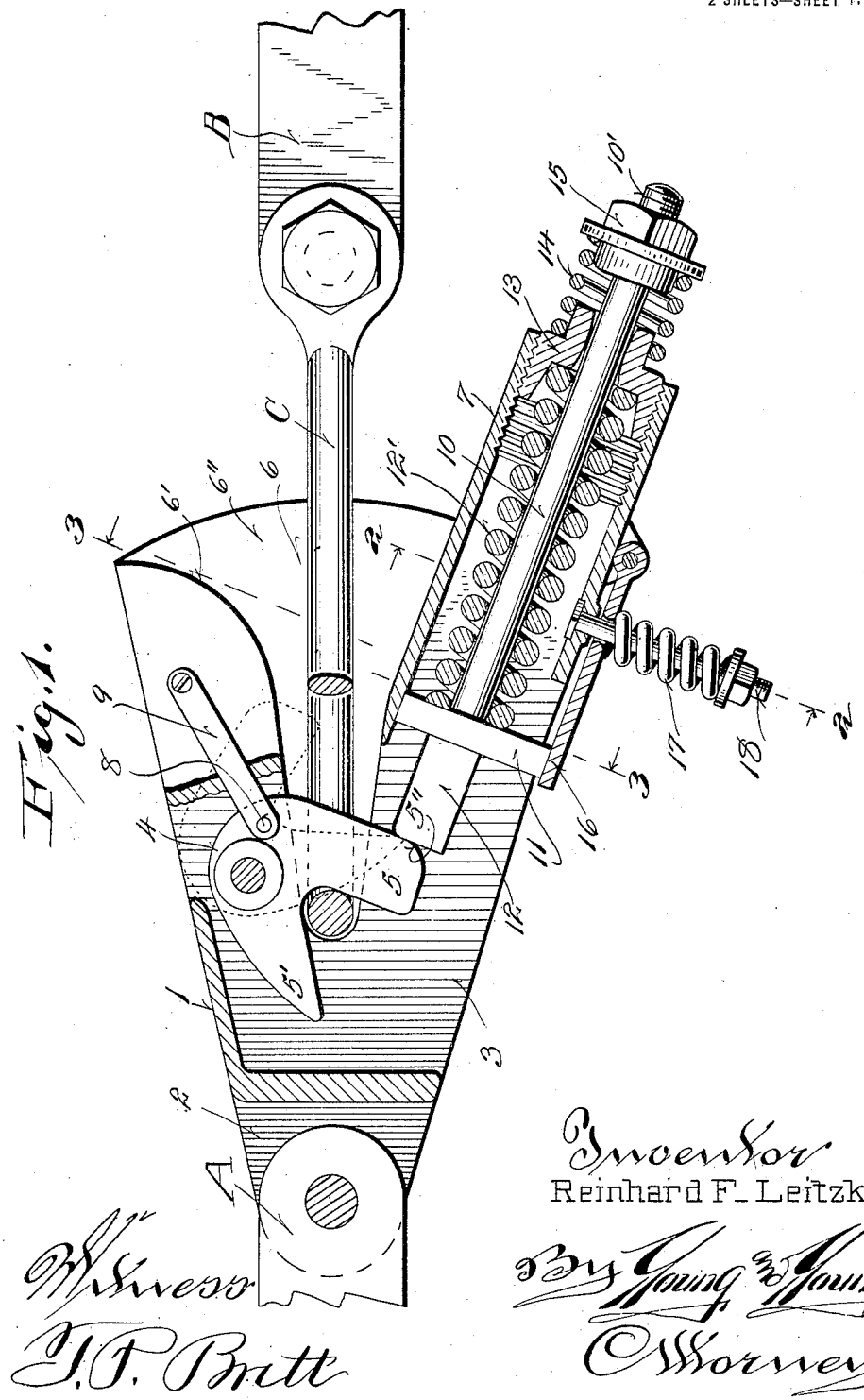
Inventor
Reinhard F. Leitzke R. F. LEITZKE.
AUTOMATIC COUPLING.
APPLICATION FILED NOV. 9, 1920.
1,382,296.
Patented June 21, 1921.
2 SHEETS—SHEET 2.
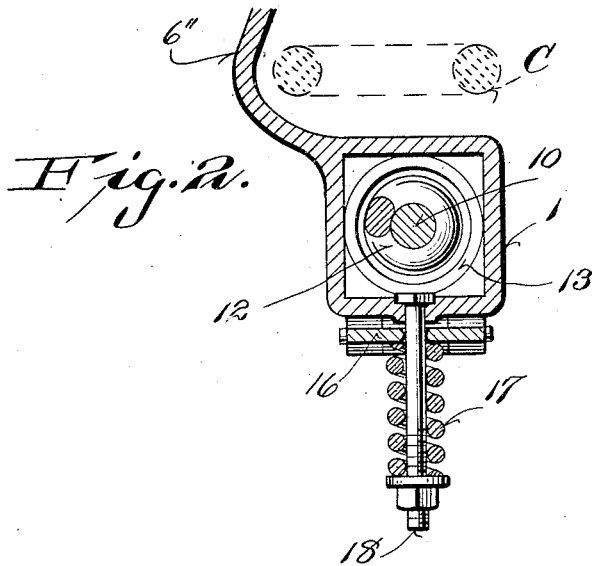
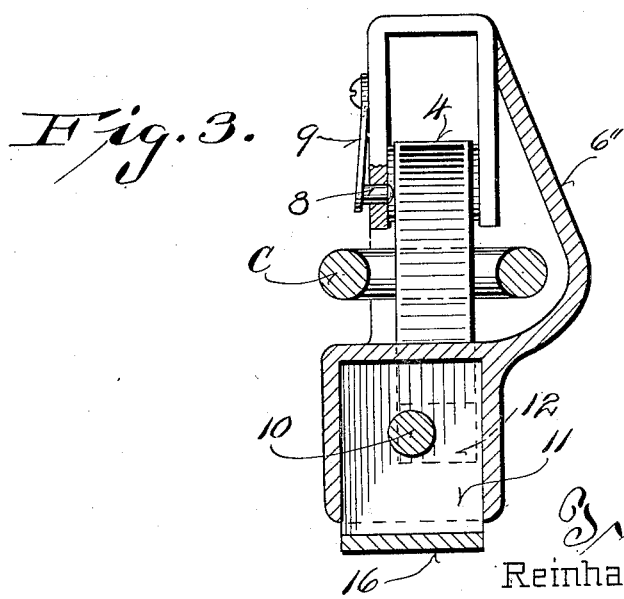
Inventor
Reinhard F. Leitzke

UNITED STATES PATENT OFFICE.

REINHARD F. LEITZKE, OF HUSTISFORD, WISCONSIN.

AUTOMATIC COUPLING.

1,382,296. Specification of Letters Patent. Patented June 21, 1921.

Application filed November 9, 1920. Serial No. 422,811.

*To all whom it may concern:*

Be it known that I, REINHARD F. LEITZKE, a citizen of the United States, and resident of Hustisford, in the county of Dodge and State of Wisconsin, have invented certain new and useful Improvements in Automatic Couplings; and I do hereby declare that the following is a full, clear, and exact description thereof.

My invention has for its object to provide a simple, durable and effective tractor coupling for automatically releasing a trailing farm implement when the same strikes an obstruction or overload strain is put upon the tractor. The hitch coupling is particularly adapted for use in connection with draft plows or the like, wherein the shovel or teeth of such implements may occasionally come in contact with embedded stones, ruts or the like.

The construction and arrangement of the hitch coupling is such that the coupling will automatically release under-predetermined abnormal load strain to avoid permanent damage, either to the tractor or implement, and the device is also arranged so that the driver, with the aid of a grappling hook, can readily back the tractor and recouple the implement from a position upon the driver's seat, by simply lifting the coupling link of the implement to a position of rest, where the end of the link will be supported upon a receiving tongue and a further rearward movement of the tractor will cause the link to be guided into locked position with relation to a trigger mechanism carried by the coupling head.

With the above objects in view, the invention consists in certain peculiarities of construction, and combination of parts, as are hereinafter set forth with reference to the accompanying drawing.

In the drawing,

Figure 1 represents a sectional elevation of a hitch coupling embodying the features of my invention, the same being shown connected to a tractor draft bar and coupled to the beam of a farm implement by means of a link.

Fig. 2 is a cross section of the same as indicated by line 2—2 of Fig. 1, taken in the direction of the arrows, and Fig. 3 is a similar cross section as indicated by line 3—3 of Fig. 1.

Referring by characters to the drawing, A represents the draft bar of a tractor and B the beam of a farm implement, such for example as a plow or a cultivator. The beam has pivotally connected thereto a draft link C, which draft link as shown is in locked position with relation to the coupling.

The coupling comprises a hollow head 1, having rearwardly extended ears 2 for connection to the draft bar A. The head is provided with a vertically disposed slot 3 extending therethrough, into which is pivotally mounted a tooth 4, the same having front and rear prongs 5 and 5' respectively, which prongs are adapted to overlap the end of the link C. The head is also provided with a mouth 6 having a flared roof wall 6', and one side wall 6", which walls serve to deflect the link into engagement with the double prong tooth. The link is further deflected into the mouth of the head by means of a downwardly, inclined hollow tongue 7, the upper wall of which serves as a temporary rest for the end of the link prior to a coupling operation. The head is also provided with a friction plug 8, which extends through an aperture in the side wall of said head, and is adapted to engage the adjacent face of the tooth, whereby the latter is frictionally held in a receiving or open position with relation to the link. The friction plug is yieldingly controlled by a leaf spring 9, which is fast to the exterior wall of the head in a suitable manner.

Mounted in the hollow tongue 7 is a reciprocative plunger 10, which plunger at its rear is provided with a rectangular flange 11 that has extended therefrom a tooth engaging nose 12.

A locking coil spring 12' surrounds the stem 10 of the plunger, and its front end impinges against the flange 11, while its rear end engages a tension adjusting collar 13, which collar is in threaded union with the front end of the hollow tongue. The bore of said collar is preferably flared in opposite directions to serve as an oscillatory bearing for the forward portion of the plunger stem 10', which stem extends beyond the collar and has mounted thereon a coil spring 14 adapted to be adjustably compressed against the outer face of the collar, by a tension adjusting nut 15, it being understood that this spring is delicate in tension compared to the locking coil spring 12'.

As previously mentioned, the plunger 10 is arranged to have a slight oscillatory movement upon its collar bearing, and the rear or nose end 12 of the plunger is yieldingly forced in an upper direction, by supporting plate 16, which plate engages the underface of the flange 11 and is held thereagainst by a coil spring 17, which surrounds a stem 18 that projects from the underside of the tongue 7, it being understood that the stem extends through an aperture formed in the supporting plate. The supporting plate in turn is pivotally connected to the tongue as shown.

Hence, it will be seen that the yielding supporting plate will tend to force the tooth engaging end 12, of the plunger upwardly, against the outer curved wall of the tooth prong 5, and this upward movement is limited by the engagement of the top surface of the flange 11, with the inner wall of the tongue 7.

From the foregoing description, it will be observed that the tension of the locking spring 12 may be varied in proportion to the normal draft strain required for the coupled implement, and when the parts are in the position shown in Fig. 1, should the farm implement strike an obstruction, the overload strain between it and the tractor will cause the plunger to yield backwardly, whereby the locking tooth 4 will swing upon its axis to free the end of the link, and at the same time, the forward prong 5 will swing to the position indicated in dotted lines, so as to present a receiving face or jaw for the coupling link, when it is again forced into position. The tooth is frictionally held in its receiving position by means of the spring control plunger 8, and the rear tooth prong 5' in this position comes against the end face of the plunger nose.

Obviously when the plunger is released, due to automatic uncoupling, it will be forced forward by the locking spring until such time as the coil spring 14 neutralizes the tension.

When the link C is to be recoupled, the head 1 is brought to a position with relation to the coupling link C, so that the end of said link will rest upon the upper surface of the hollow tongue, and thereafter the tractor is backed, causing the end of the link to enter the mouth of the head, and when it strikes the tooth prong 5', it will cause said tooth to rock downwardly whereby the curved end face 5'' of the tooth prong will come to rest against the angular end face of the plunger nose. Hence, in this locked position, the draft strain upon the implement will cause a slight oscillatory movement of the tooth whereby the locking spring 12' will compensate for such movement, and it follows that when the resistance of this locking spring is overcome, the parts will again automatically release.

While I have shown and described a structure embodying my invention in all its details, it is understood that I may vary such structural details within the scope of the claims.

I claim:

1. A coupling comprising a head provided with a flared mouth, a downwardly inclined hollow tongue extending from the head, a tooth pivotally mounted within the mouth having inner and outer prongs adapted to receive a coupling link, a spring controlled plunger mounted in the hollow tongue having a nose engageable with the tooth, the plunger being arranged to have an oscillatory bearing at its front end and a yielding supporting plate for the nose end of said plunger.

2. A coupling comprising a head having an opened flared mouth, a downwardly inclined hollow tongue extending from the said mouth, a double prong tooth pivotally mounted within the mouth adapted to receive a coupling link, a plunger reciprocatively mounted within the hollow tongue having a nose adapted to engage one of the tooth prongs, a coil spring surrounding the plunger, an adjustable bearing collar for the front end of said plunger, and engaging the spring whereby its tension may be varied, a second coil spring surrounding the plunger stem and having one end engageable with the collar, an adjusted nut carried by the plunger stem for regulating the tension of said spring, and a pivoted spring controlled supporting plate carried by the tongue for engagement with the nose end of the plunger, whereby the same is rendered oscillatory with relation to its bearing.

In testimony that I claim the foregoing I have hereunto set my hand at Hustisford in the county of Dodge and State of Wisconsin.

REINHARD F. LEITZKE.